Patented Dec. 29, 1925.

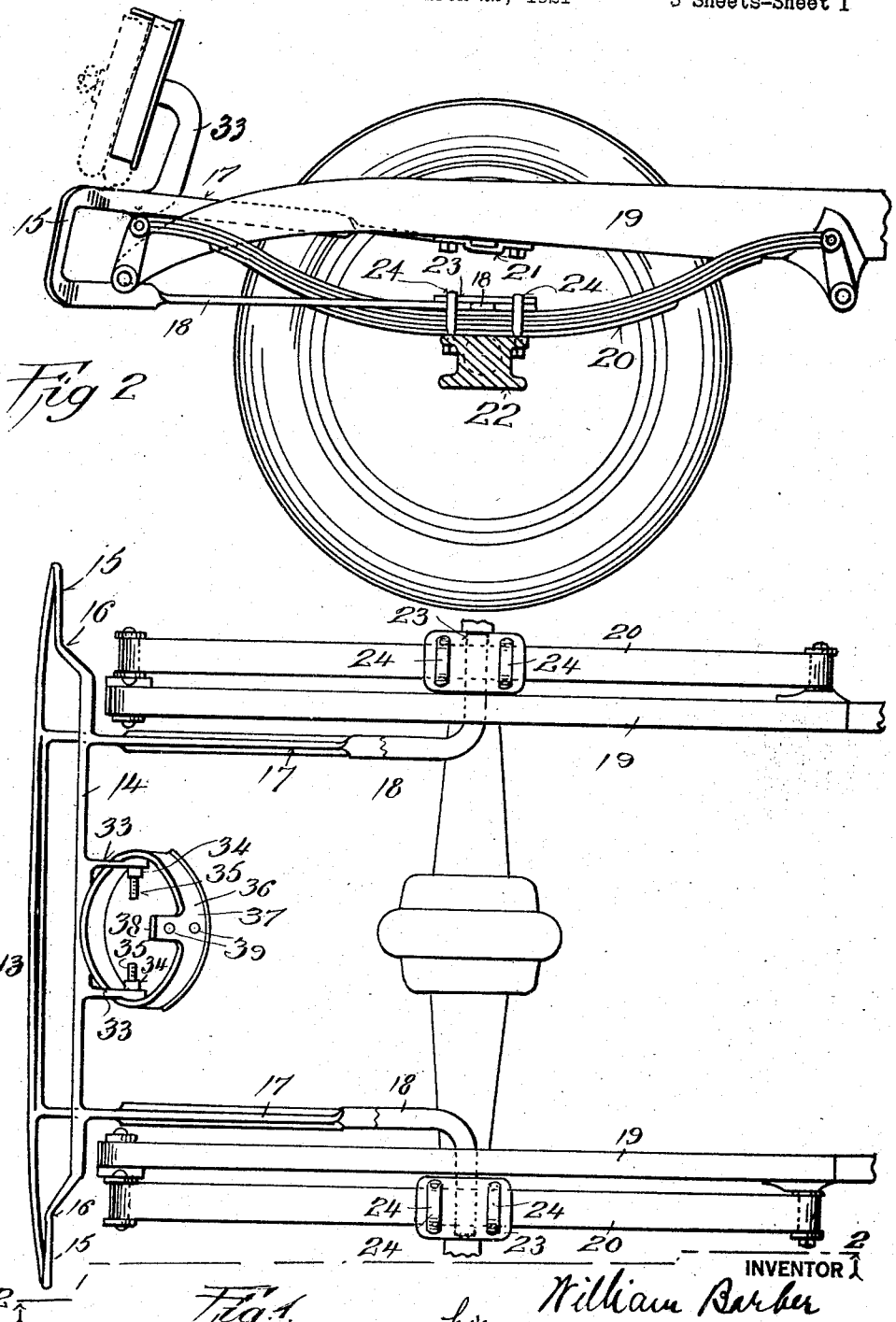

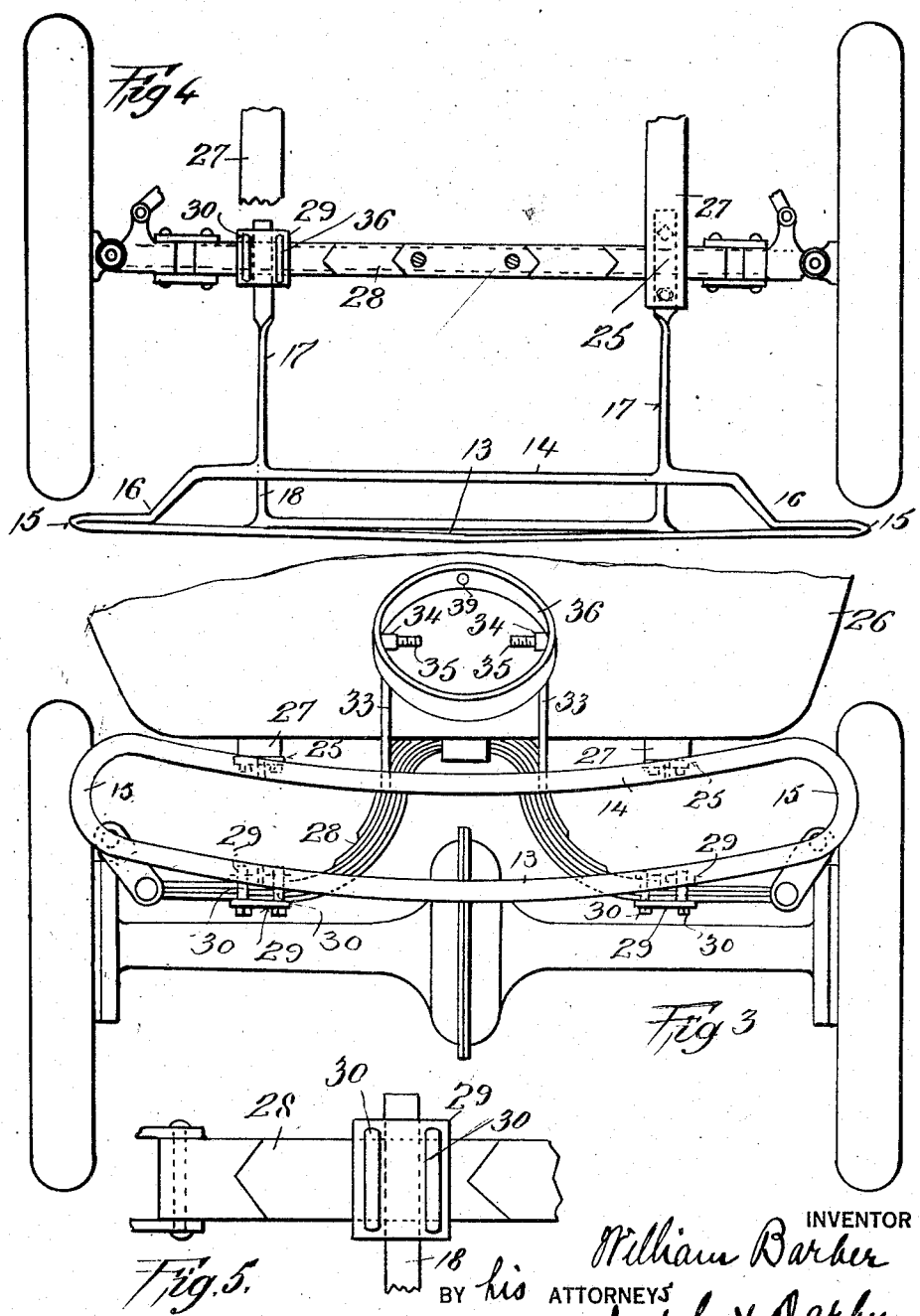

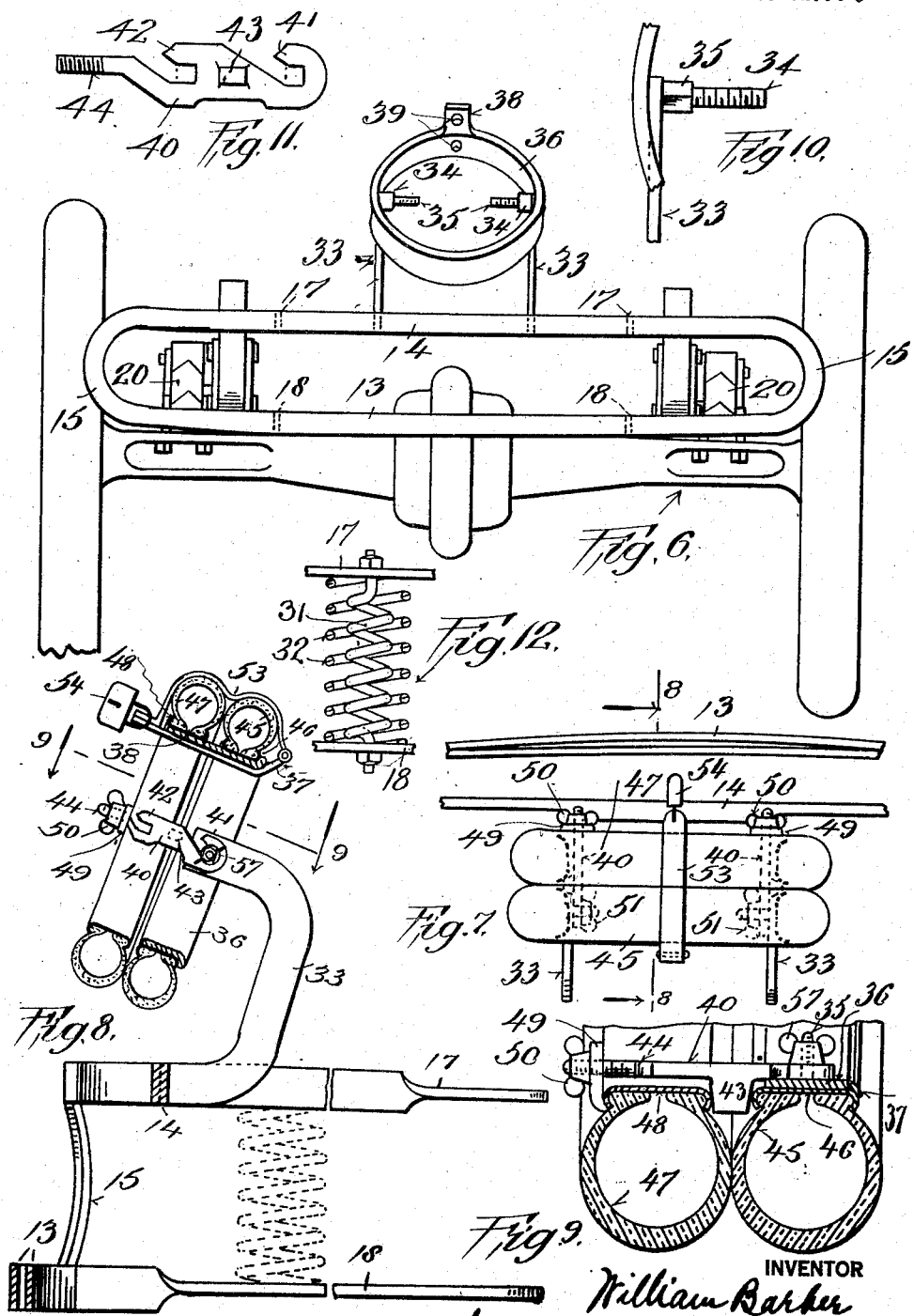

1,567,781

UNITED STATES PATENT OFFICE.

WILLIAM BARBER, OF NEW YORK, N. Y.

COMBINED TIRE CARRIER, BUFFER, AND SHOCK ABSORBER.

Application filed March 22, 1921. Serial No. 454,397.

*To all whom it may concern:*

Be it known that I, WILLIAM BARBER, a citizen of the United States, residing in the city of New York, county of Kings, State of New York, have made a certain new and useful Invention in Combined Tire Carrier, Buffer, and Shock Absorber, of which the following is a specification.

This invention relates to a combined tire carrier buffer and shock absorber device for automobiles.

The object of the invention is to provide a combined tire carrier buffer and shock absorber device which is simple in structure, economical to manufacture, easy to attach to or remove from an automobile, and efficient in operation.

A further object is to provide a device of the nature referred to, which is adapted to carry one or more extra or spare tires.

A further object is to provide a device of the nature referred to, which will constitute a buffer to take and absorb the impact of ordinary collision.

A further object is to provide an attachment of the nature referred to which will take and absorb the ordinary vertical shocks and jars due to the operation of the car over rough or uneven ground.

Other objects of the invention will appear more fully hereinafter.

The invention consists substantially in the construction, combination, location and relative arrangement of parts, all as will be more fully hereinafter set forth, as shown in the accompanying drawings, and finally pointed out in the appended claims.

Referring to the accompanying drawings,—

Fig. 1 is a view in top plan, showing somewhat in diagram the rear end of an automobile chassis, and a combined tire carrier buffer and shock absorber device, embodying my invention, applied thereto;

Fig. 2 is a view in section on the line 2, 2, Fig. 1, looking in the direction of the arrows;

Fig. 3 is a view in rear end elevation of an automobile of a different type from that of Figs. 1 and 2, showing a slightly modified form of combined device of my invention applied thereto;

Fig. 4 is a top plan view of the front end of a chassis frame of the type shown in Fig. 3, with another slightly modified form of combined device embodying my invention applied thereto, parts being broken;

Fig. 5 is a broken detail view illustrating an arrangement for attaching the combined device of my invention to the body springs of the type of machine shown in Figs. 3 and 4;

Fig. 6 is a view in rear end elevation of the construction shown in Figs. 1 and 2;

Fig. 7 is a broken view in top plan of a portion of the combined device of my invention detached, with the tire carrier supporting two tires;

Fig. 8 is a view in section on the line 8, 8, Fig. 7, looking in the direction of the arrows;

Fig. 9 is a broken view in section on the line 9, 9, Fig. 8, looking in the direction of the arrows;

Fig. 10 is a broken detached detail view of a portion of the tire carrier;

Fig. 11 is a detached detail view of a clamp device employed in connection with the tire carrier and adapted to be employed for retaining either one or two tires thereon;

Fig. 12 is a detail view showing the application where necessary or desirable, of additional shock absorbing springs.

The same part is designated by the same reference numeral wherever it occurs throughout the several views.

According to modern automobile practice, it is the custom to equip the machine with buffers or fenders, sometimes on the front, sometimes at the rear, and sometimes at both front and rear, the purpose and function of which is to take the initial shock of collision, and absorb the same thereby preventing or reducing injury to the more vital parts of the machine.

It is also a customary practice to employ a carrier for extra or spare tires.

It is also common to employ shock absorbing devices between the body of the car and its supporting chassis or frame.

Various forms of these devices have been devised and are in extensive use, but, so far as I am aware, such devices, as heretofore proposed and used, have been wholly independent of each other, and each is usually regarded as an auxiliary device, any one or more or all of them to be obtained and applied, or omitted according to the tastes and desires of individual car owners, and their ability to purchase and pay for the same.

Since such devices are often regarded as specialties and, to some extent at least, unnecessary, an auxiliary equipment including all of them adds very appreciably to the cost in purchasing a car where they form part of the regular equipment of the car. And where such devices do not form part of the car equipment when the car is purchased, which is the most common practice, and have to be purchased separately and applied to the car by the individual car owner, the cost often is regarded as too great a burden, with the result that many car owners fail to equip their cars with such devices, and consequently fail to realize the protection, ease and comfort which such devices afford. In the case of extra or spare tires, it is often the case with carriers at present on the market that provision is made to carry only one extra or spare tire, and when it is desired to carry two or more, this cannot be conveniently done.

It is among the special purposes of my present invention to provide a single structure which combines within itself the functions of a buffer or fender, a tire carrier capable of accommodating a plurality of tires, and a shock absorber, and which can be quickly, easily and readily applied to and removed from a chassis or automobile supporting frame as an entity, and which, at the same time is economical to manufacture, and can therefore be marketed at low cost to the car owner.

In carrying out my invention, I propose to construct a framework preferably of sheet steel stampings, and which possesses a desirable resiliency, not only to serve as a fender or buffer in case of collision, but also to take and absorb the shocks and vibrations due to the car operation. This frame may be mounted for use either at the front or rear end, or at both ends of the car, and in such relation to the car body and its supporting frame or chassis, to which the device is connected, as to occupy the position ordinarily occupied by buffer or fender devices at present in use. In other words, the frame of the combined device of my invention is connected to and supported upon the automobile to extend transversely across the one or the other or both ends thereof, and in such manner as to yieldingly oppose any shock of collision, and absorb the same. The shock absorbing function of the device is secured by so connecting the frame of the device respectively to the body of the automobile and to the chassis, as to resist, through the natural resiliency of the frame, relative movements of the body and chassis. In this connection, and if desired, the natural resiliency of the frame of the device may be supplemented by suitable spring devices interposed in the frame. To provide a carrier for one or more tires, I propose, in accordance with my invention, to mount a tire carrier upon the frame of the device, and to provide means for receiving and detachably securing thereon one or more tires.

In the accompanying drawings, I have shown various structures and arrangements illustrative of the principles of my invention, but it is to be understood that the invention may be carried into practice in many different structures and arrangements. I do not desire, therefore, to be limited or restricted, in the broader scope of my invention, as defined in the claims, to the specific structures and arrangements shown and now to be described.

Referring to the drawings, the frame of the combined device consists of the transversely extending members 13, 14, spaced apart from each other but joined together at each end by the loop portions 15. The frame members 13 and 14 are substantially parallel with each other, but, preferably, the member 14 is offset laterally towards the car, and from the vertical plane of the member 13, the loop portions 15, being laterally bent or deflected, as indicated at 16, Figs. 1–4, to secure the offset relation referred to. By reason of this arrangement, the frame member 13 of the device projects farther from the end of the car than does the member 14, and hence constitutes the bumper or fender portion of the combined device. If desired, and in order to secure strength and ruggedness in this member 13, and enable it to efficiently perform the function of a bumper or fender, said member 13 may be built up of more than one lamination, two such laminations being shown in Figs. 1, 4 and 8.

Each of the frame members 13, 14, is provided with a pair of supporting arms which extend laterally therefrom, adjacent the ends thereof and towards, for attachment to, the automobile. The arms 17 of the upper member 14 are suitably attached to a convenient part of the automobile body or its chassis while the arms 18 of the lower frame member 13 are suitably attached to the car axle or the body supporting springs, or other convenient part of the car, the important thing being that the arms 17, 18 should be connected to parts of the car which are relatively movable. In the arrangement shown in Figs. 1 and 2, the arms 17, are clamped to the side members 19 of the chassis at opposite sides of the car, and which are suspended at their ends upon the car springs 20, according to one well known type or make of car. The clamp which secures the ends of the arms 17 to the chassis members 19, is shown, in this instance, as a clamp strap 21, which straddles over the end of the arm 17, and is bolted to the underside of the chassis member 19. The ends of the arms 18, in this instance, are clamped to the axle 22 of the car or to the car springs 20 at the point where such car springs are clamped and supported upon the axle. A convenient arrangement is to employ the same clamp device to secure both the arm and the car spring to the axle. In the form shown this clamp device includes a keeper or plate 23 which is disposed over the end of the arm 18 and the spring 20, and which plate is secured in place by the U-bolts 24 passing through said plates and straddling the spring 20, and bolted to the axle 22. In practice I prefer to dispose the U-bolts 24 on opposite sides of the ends of the arms 18, and to space them apart therefrom a sufficient distance to permit a sliding movement of the arms within the clamp device fore and aft with respect to the length of the car.

From the foregoing description it will be understood that at their points of attachment to the car the ends of the upper pair of arms are clamped against movement while the ends of the lower pair of arms are permitted a desirable range of play in their clamp devices in a direction lengthwise of the car. This range of play or movement secures the desired yielding resistance to enable the device to perform its function as a buffer or fender to take and absorb the shock of collision. It will be understood that when the device is attached to a car, the transverse member 13 extends to a greater distance from the car end than does the member 14 of the frame, and hence the impact of a collision is taken by said member 13. But since the lower arms 18 are permitted a range of sliding movement lengthwise of the car against a sliding frictional resistance produced by the clamping plates 23, thereon, it will be seen that in case of collision, a tilting compression is imparted to the entire frame around the fixed points of attachment of the arms 17. This tilting movement is resisted by the resiliency of the spring frame, and this resiliency likewise tends normally to return or restore to and maintain in working position the impact receiving member 13 of the frame.

The same result is attained in the arrangement shown in Figs. 3 and 4, wherein the upper arms 17 of the frame of the attachment are fixed by clamp plates 25 to a convenient part of the car body 26 or its framing, indicated at 27, whereas the lower arms 18 are permitted a range of a longitudinal movement, being retained in sliding frictional engagement with and transversely across the car body springs 28, by the keeper plates 29 and the U-bolts 30.

It will be observed that, in Figs. 1 and 2, the extreme ends of the arms 17, 18, are bent or deflected laterally in order to be brought into proper relation with respect to their securing clamp members 21, 23, whereas in the arrangement shown in Figs. 3, 4 and 5, the arms 17, 18, are straight throughout their length. This is a mere difference in detail, and is dependent upon the type or make of car to which the attachment is to be applied.

By reason of the fact that the arms 17, 18, which are in effect spring arms, due to their natural resiliency, and the resiliency of the frame structure of which they form a part, are respectively connected to the car body, or its chassis, and to the axle or body supporting springs, or other parts which are relatively movable vertically, the shock absorbing functions of the attachment are realized. It is to be understood, of course, that my invention is not to be limited or restricted in respect to the particular parts to which the ends of the arms 17, 18, are to be connected, in applying the attachment to a car. The important feature, in this connection, is that the ends of said arms should be connected respectively to parts of the car structure which are movable vertically relative to each other in the ordinary operation of the car, and by reason of such relative vertical movements of the two sets of spring arms, the desired shock absorbing functions are realized.

If desired, and instead of relying entirely upon the spring action of the arms and of the metallic frame of which they form a part, to secure the shock absorbing characteristics of the attachment, the resiliency of said arms and frame may be reinforced or supplemented by auxiliary springs 31, 32, interposed between the upper and lower arms 17, 18, as clearly indicated in Fig. 12. In practice, where such additiontl shock absorbing spring action is desired, I prefer to employ both a tension coil spring 31, and a compression coil spring 32, arranged in sets. In the form shown each of these springs is a coiled spring, but this is a detail which may be departed from without affecting the principle or mode of operation of my invention. As shown the compression spring 31 of each set is interposed between an upper arm 17 and a lower arm 18, and serves to yieldingly resist a relative movement of said arms towards each other. The spring 32 of each set is a tension spring, and is connected at its ends respectively to an arm 17, and an arm 18, and serves to yieldingly resist separation of said arms, or relative movement thereof apart from each other.

This arrangement affords a most efficient, simple and economical shock absorber, whether the auxiliary springs are employed or not.

I will now describe that part or feature of my invention which constitutes the carrier for one or more spare or extra tires.

The framework of the attachment is provided with tire carrier arms 33. In the particular arrangement shown, to which, however, my invention is not to be limited or restricted, the arms 33 are formed with or secured to the upper frame member 14, and extend therefrom laterally and upwardly in the fashion of goosenecks, their lateral extension from the frame member 14 being towards the car. The upper ends of the arms 33, carry lugs or bolt members, which project towards each other. Each of these lugs or bolt members, in the form shown, is provided with a polygonally shaped portion 34, and a threaded end portion 35. Attached to the ends of the arms 33 is a tire carrier band or ring 36, the ends of the arms 33 being secured to the inner surface of said carrier band at approximately diametrically opposite points thereof, the arrangement being such that the band 36 is supported in a vertically inclined position. Where only one extra or spare tire is to be carried, a plain cylindrical band or ring is sufficient, said band having one edge 37, thereof turned out from the peripheral plane of the band to form a shoulder against which the spare tire may be clamped. Where two or more spare tires are to be provided for, the band 36 is formed with one or more projecting portions 38, which extend laterally from the edge and in the peripheral plane of the band. Ordinarily only one such projection is sufficient. The band 36 and the extension 38, are provided with radial holes 39, therethrough to receive the valve nipples of the pneumatic tires to be carried thereby. In order to clamp and hold one or more extra or spare tires on the tire carrier, I provide the clamp members 40, see particularly Figs. 8, 9 and 11. These members are each formed or provided with a plurality of hook portions 41, 42, in one edge thereof, a lug or projection 43 on one side or face, and a threaded end portion 44. When it is desired to carry two extra tires or shoes, one of them, indicated at 45, with its rim 46 is mounted upon the carrier band or ring 36, with one side edge of the rim bearing against the upturned edge 37 of the band 36. The other spare or extra tire or shoe, 47, with its tire rim 48, is slipped upon the edge extension 38 of the carrier band, the valve nipples of the tires or shoes being received through the holes 39. The tires are then clamped together and firmly held in place by the clamp members 40, the hook portions 41 thereof engaging over the polygonally shaped portions 35 of the bolts or studs carried by the arms 33. A clip plate 49 is then slipped over the threaded end portion 44 to engage against the outer edge of the outermost tire 47. A nut 50, threaded onto the end portion 44 completes the clamping assemblage. The lug or projection 43 is disposed between the adjacent edges of the two tires 45, 47. With this arrangement by simply turning up on the nuts 50, the tire 45 is firmly clamped between the lugs 43, and the upturned edge 37, of the band 36, while the tire 47 is firmly clamped between the clip 49 and the lug 43. The engagement of the hook portion 41 of the clamp member 40 upon the portion 35 of the stud or bolt, is maintained by means of a nut 51 threaded onto the threaded portion 34 of the stud bolt. By simply tightening up on the nuts 51, the clamp members 40 are efficiently and securely held in place upon the stud bolts. To remove the tire 47, it is only necessary to remove the nuts 50 and the clips 49, and lift said tire off the extension 38 of the carrier band. If tire 45 is also to be removed, the nuts 51 are also removed thereby enabling the clamp members 40 to be detached and then both tires 47, 45, may be lifted off the carrier. If only one spare tire is to be carried, then the hook portions 42 of the clamp members are engaged over and clamped, by nuts 51, upon the stud bolts, and the clips 49 are engaged and clamped, by nuts 50, against the outer edge of the tire to clamp the latter against the upturned shoulder 37 of the carrier band.

As a safety measure, and to prevent the extra or spare tires from being removed without authority, a locking strap 53 is looped around the tires and locked thereon by padlock or other convenient lock device, indicated at 54, the key to which may be carried by the car owner, or the chauffeur.

It will be seen that by supporting the arms 33 upon the upper member 14 of the bumper frame, which is offset inwardly from the vertical plane of the lower member 13 of said frame, and by extending said arms 33 inwardly and upwardly, all as above described, the tire carrier device is disposed inwardly so far away from the vertical plane of the bumper member 13 of the frame as to be removed from the danger of being struck or injured in case of ordinary collision impact, the shock, in such case, being taken by the bumper portion 13, and absorbed in the entire framework of the attachment, as above explained.

From the foregoing description, it will be seen that I provide an exceedingly simple, effective and economical attachment which embodies and combines bumper, shock absorbing and tire carrier functions, and which can be readily and easily applied to a car, or removed therefrom, wherein, if desired, additional shock absorbing springs may be used, and one or a plurality of extra or spare tires may be carried.

While I have shown and described attachments embodying my invention, in various forms, and attached in various manners to cars, it is to be understood that the forms and arrangements shown, while the best in which I at present contemplate embodying my invention, are nevertheless illustrative of the principle and mode of operation set forth, and consequently, in the broader scope of my invention, as defined in the claims, I do not desire to be limited or restricted to these particular illustrative forms and arrangements.

But having now set forth the objects and nature of my invention, what I claim as new and useful and of my own invention, and desire to secure by Letters Patent, is,—

1. A combined bumper and shock absorbing attachment for automobiles, which includes a flexible framework having means to attach the same respectively to the car axle and to the supporting frame.

2. A combined bumper and shock absorbing attachment for automobiles, which includes a flexible framework having means to attach the same respectively to the car axle and to the supporting frame, said framework having a portion disposed to extend transversely across the end of the automobile.

3. A combined tire carrier bumper and shock absorbing attachment for automobiles, which includes a flexible framework having means to attach the same respectively to the car axle and to the supporting frame, said framework having means to receive and support one or more spare or extra tires.

4. A combined bumper and shock absorbing attachment for automobiles, which includes a flexible framework having means to attach the same respectively to the car axle and to the supporting frame, said framework having a portion disposed to extend transversely across the end of the automobile, and means to receive and support one or more extra or spare tires.

5. A combined bumper and shock absorbing attachment for automobiles, which includes a flexible framework having means to attach the same respectively to the car axle and to the supporting frame, and auxiliary spring devices to supplement the resiliency of the framework in resisting the relative vertical movement of the automobile and its frame.

6. A combined bumper and shock absorbing attachment for automobiles, which include a flexible metallic framework having an upper and a lower member arranged in parallel relation, but laterally displaced out of the same vertical plane with relation to each other, and means to attach the same respectively to relatively vertically movable parts of the automobile.

7. A combined bumper and shock absorbing attachment for automobiles, which include a flexible metallic framework having an upper and a lower member, each of said members having supporting arms, and means to attach said arms respectively to relatively vertically movable parts of the automobile.

8. A combined bumper, and shock absorbing attachment for automobiles, which include a flexible metallic framework having an upper and a lower member, each of said members having supporting arms, the arms of the upper member being attached to the body frame, and the arms of the lower member to the automobile axle.

9. A combined bumper, and shock absorbing attachment for automobiles, which include a flexible metallic framework having an upper and a lower member laterally displaced with respect to each other and respectively connected to relatively vertically movable portions of the automobile.

10. A combined bumper, and shock absorbing attachment for automobiles, which include a flexible metallic framework having an upper and a lower member laterally displaced with respect to each other and respectively connected to relatively vertically movable portions of the automobile, the connection of one of said members being a loose connection.

11. A combined bumper and shock absorber attachment for automobiles, which includes a flexible metallic framework having an upper and a lower member, means to rigidly attach one of the said members to one part of the automobile, and means to loosely connect the other of said members to another and relatively vertically movable part of the automobile.

12. A combined bumper and shock absorber attachment for automobiles, which includes a flexible metallic framework having an upper and a lower member, one of said members being displaced laterally out of the vertical plane of the other, means for rigidly connecting one of said members to a part of the automobile, and means to loosely connect the other member to another and relatively vertically movable part of the automobile.

13. A combined bumper and shock absorber attachment for automobiles, which includes a flexible metallic framework having an upper and a lower member, said members being connected together at their ends, and each having supporting arms, the supporting arms of the said upper and lower members respectively connected to relatively vertically movable parts of the automobile.

14. A combined bumper and shock absorber attachment for automobiles, which includes a flexible metallic framework having an upper and a lower member, each of said members having supporting arms, said arms respectively connected to relatively vertically movable parts of the automobile, and auxiliary springs interposed between the upper and lower arms.

15. A combined tire carrier, bumper and shock absorber attachment for automobiles, including a flexible metallic framework having portions respectively connected to relatively movable parts of the automobile, and a carrier device for one or more spare tires.

16. A combined tire carrier, bumper and shock absorber attachment for automobiles, including a flexible metallic framework, having portions respectively connected to relatively movable parts of the automobile, and a carrier device for one or more spare tires, and means to detachably secure one or more spare tires on said carrier device.

17. A combined tire carrier, bumper and shock absorber attachment for automobiles, including a flexible metallic framework, having portions respectively connected to relatively movable parts of the automobile, and a carrier band to receive a spare or extra tire, said band having an upturned flange at one edge, and means to detachably clamp the spare tire against said flange.

18. A combined tire carrier, bumper and shock absorber attachment for automobiles, including a flexible metallic framework, having portions respectively connected to relatively movable parts of the automobile, and a carrier band to receive a spare or extra tire, said band having an extension in the plane of the periphery thereof.

19. A combined tire carrier, bumper and shock absorber attachment for automobiles, including a flexible metallic framework, having portions respectively connected to relatively movable parts of the automobile, and a carrier band to receive a spare or extra tire, said band having an extension in the plane of the periphery thereof, and means to detachably clamp one or more spare tires on said band and extension.

20. A combined tire carrier, bumper and shock absorber attachment for automobiles, including a flexible metallic framework having portions connected to the automobile and a band supported on said framework to receive one or more spare tires, and means to detachably clamp the spare tires on said band.

21. A combined tire carrier, bumper and shock absorber attachment for automobiles, including a flexible metallic framework having portions connected to the automobile, arms carried by said framework, and a spare tire receiving band supported by said arms.

22. A combined tire carrier, bumper and shock absorber attachment for automobiles, including a flexible metallic framework having portions connected to the automobile, arms carried by said framework, a spare tire receiving band supported by said arms, and clamp members detachably engaging said arms to removably clamp one or more tires upon said band.

23. A combined tire carrier, bumper and shock absorber attachment for automobiles, including a flexible metallic framework having portions connected to the automobile, a band supported on said framework, said band having an extension in the plane of the periphery thereof, and clamp members to detachably clamp one or more spare tires on said band and extension.

24. A combined tire carrier, bumper and shock absorber attachment for automobiles, including a flexible metallic framework having portions connected to the automobile, arms carried by said framework, studs carried by said arms, a spare tire receiving band also carried by said arms, and clamp members having hook portions to detachably engage said studs and having means to clamp one or more spare tires on said band.

25. A combined tire carrier, bumper and shock absorber attachment for automobiles, including a flexible metallic framework having portions connected to the automobile, arms carried by said framework, studs carried by said arms, a spare tire receiving band also carried by said arms, and clamp members having hook portions to detachably engage said studs and clips carried by said clamp members to detachably clamp one or more spare tires on said band.

26. In a combined tire carrier, bumper and shock absorber attachment for automobiles, a clamp device for extra or spare tires including a clamp member having a plurality of hook portions and a clip device detachably mounted on the end of said member.

27. In a combined tire carrier, bumper and shock absorber attachment for automobiles, a tire clamp member for spare tire carriers having a hook portion to engage the carrier, and a retaining clip detachably connected to said member.

28. In a combined tire carrier, bumper and shock absorber attachment for automobiles, a tire clamp member for spare tire carriers having a hook portion to detachably engage the carrier, a retaining clip carried by said member and a clamp nut therefor.

29. In a combined tire carrier, bumper and shock absorber attachment for automobiles, a tire clamp member for spare tire carriers having a plurality of hook portions, any one of which is adapted to detachably engage the carrier according to the number of spare tires to be carried, and a clamping clip carried by the said member to clamp the tire or tires upon the carrier.

30. In a combined tire carrier, bumper and shock absorber attachment for automobiles, a tire clamp member having one or more hook portions at one edge thereof, and a threaded end portion, and a clamping clip detachably mounted on the threaded end portion.

31. In a combined tire carrier, bumper and shock absorber attachment for automobiles, a tire clamp member having one or more hook portions at one edge thereof, and a lug on one side thereof intermediate its ends, and a clamping clip detachably connected to one end of said member.

32. In a combined tire carrier, bumper and shock absorber attachment for automobiles, a tire clamp member having one or more hook portions, and a clamping clip detachably connected to the end of said member.

33. A buffer comprising a pair of U-shaped resilient strips and a bar connecting the rounded portions of the strips, the corresponding extremities of the strips being connected to relatively movable parts of the vehicle.

34. The combination with a vehicle frame and running gear, of a pair of resilient strips each connected at one end to the frame and at the other end to the gear, the intermediate portion of the strips extending beyond the said extremities to permit relative movement between the gear and the frame, and a bar connected to the intermediate portions of the strips.

35. The combination with a movable frame and running gear, of a buffer therefor comprising a bar and means forming a double yielding support from the bar to the frame and from the bar to the running gear whereby a relative movement of the frame and running gear is permitted without substantial displacement of the buffer bar.

36. In a buffer of the class described, a buffer bar, resilient means extending therefrom to form a yielding support for the bar from a vehicle frame and also extending from the bar to a running gear beneath the frame, and fastening means for attaching the other said means separately to a vehicle frame and to a running gear.

37. The combination with a vehicle frame and a running gear frame, of a buffer bar, means for supporting the buffer from the vehicle frame, and additional supports from the running gear to the buffer bar.

38. The combination with a vehicle frame, of a running gear frame relatively movable, yieldable strip supports each attachable at its opposite ends to the frames, and a bumper bar attached intermediate the ends of the supports in a horizontal position.

In testimony whereof I have hereunto set my hand on this 21st day of March, A. D. 1921.

WILLIAM BARBER.